(12) United States Patent
Coviello

(10) Patent No.: US 7,267,384 B1
(45) Date of Patent: Sep. 11, 2007

(54) REMOVABLE MOUNTING BRACKET

(76) Inventor: Randy Coviello, 1016 Foxwood Dr., Lutz, FL (US) 33549

( * ) Notice: Subject to any disclaimer, the term of this patent is extended or adjusted under 35 U.S.C. 154(b) by 132 days.

(21) Appl. No.: 11/200,918

(22) Filed: Aug. 10, 2005

(51) Int. Cl.
*B60J 1/20* (2006.01)
(52) U.S. Cl. ..................... 296/1.11; 296/152
(58) Field of Classification Search ............. 296/1.11, 296/146.11, 148, 152; 248/475.1, 466; 329/871
See application file for complete search history.

(56) References Cited

U.S. PATENT DOCUMENTS

| | | | | |
|---|---|---|---|---|
| 1,110,973 | A * | 9/1914 | Tischler | 248/486 |
| 2,682,427 | A * | 6/1954 | Bright | 296/148 |
| D234,760 | S * | 4/1975 | Tanaka | D12/187 |
| 4,070,056 | A * | 1/1978 | Hickman | 296/148 |
| 4,818,088 | A | 4/1989 | Sacknoff | |
| 5,069,410 | A * | 12/1991 | McKee | 248/475.1 |
| 5,120,015 | A * | 6/1992 | do Espirito Santo | 248/479 |
| 5,489,080 | A * | 2/1996 | Allen | 248/480 |
| 5,513,048 | A * | 4/1996 | Chen | 359/881 |
| 5,516,073 | A * | 5/1996 | McMahan | 248/486 |
| D445,743 | S * | 7/2001 | Hsu | D12/187 |
| D513,724 | S * | 1/2006 | Stenzel | D12/187 |
| 2002/0114091 | A1 * | 8/2002 | Schmidt et al. | 359/871 |
| 2004/0218298 | A1 * | 11/2004 | Stenzel | 359/879 |

FOREIGN PATENT DOCUMENTS

FR 2565175 A3 * 12/1985 ................ 359/872

OTHER PUBLICATIONS http://www.4x4products.com/mirrors.html; titled "Olympic 4x4 Products :: Bumpers, Protections & Racks for Your Jeep"; archived to Jan. 27, 2006.*

* cited by examiner

*Primary Examiner*—D. Glenn Dayoan
*Assistant Examiner*—Paul Chenevert
(74) *Attorney, Agent, or Firm*—Dorothy S. Morse

(57) ABSTRACT

A quickly installed and quickly removable tubular mounting bracket that supports a side view mirror and is connected at a minimum to the upper hinge structure remaining on the side of the vehicle after the door is removed. On two-door 4x4 off road vehicles commonly referred to as JEEP, two hinge members remain after a door is removed, one above the other and set at a spaced-apart distance from one another, and the present invention can be manufactured to engage one or both of them. The mounting bracket herein further has an angle that follows the angle of the windshield for aesthetic, practical, and aerodynamic purposes, with the mounting of the brackets used for securing driver and passenger mirrors to the vehicle without doors being slightly different from one another to provide optimum driver visibility.

20 Claims, 9 Drawing Sheets

REMOVABLE MOUNTING BRACKET

CROSS-REFERENCES TO RELATED APPLICATIONS

The subject matter of the instant patent application has previously been disclosed in two Document Disclosures filed with the U.S. Patent & Trademark Office by the same inventor herein on Jun. 1, 2004, which have assigned Serial Numbers respectively of 554222 and 554223. Since the two Document Disclosures have been on record in the U.S. Patent & Trademark Office for a time period of less than two years, all benefit thereof is herein requested.

BACKGROUND

1. Field of the Invention

This invention relates to a means of mounting side view mirrors on a motor vehicle in the absence of its doors, specifically to a quickly installed and quickly removable tubular bracket that supports a side view mirror and is connected at a minimum to the upper hinge structure remaining on the side of the vehicle after the door is removed. On two-door 4×4 off road vehicles commonly referred to as JEEP, two hinge members remain after a door is removed, one above the other and set at a spaced-apart distance from one another, and different embodiments of the present invention can be made to engage one or both of them. The mounting bracket herein further has a central angle that follows the angle of the windshield for aesthetic, practical, and aerodynamic purposes, with the brackets used for securing driver and passenger mirrors to the vehicle without doors being slightly different in configuration from one another to provide optimum driver visibility. In addition, or in the alternative, the present invention may also be used for the attachment of other devices to a motor vehicle when its doors are removed, such as but not limited to a step or foothold, light, reflector, and/or other safety devices.

2. Description of the Related Art

In vehicles that have removable doors, such as a JEEP, the side view mirrors used for enhanced driver visibility are typically mounted to the doors. Thus, when the doors are removed, a driver must make other accommodations to achieve optimum visibility around the vehicle while it is being driven. One means for making side view mirrors available for driver use in the absence of vehicle doors is to fasten them with something inserted through the longitudinal bore of the door hinge structure remaining on the vehicle. However, such an attachment means is weak, and during off-road adventures can result in the loss of the mirror. In contrast, the present invention tubular structure slides over the hinge and is fastened directly to it, giving it a more sturdy connection to the vehicle. Also, when the present invention is manufactured to have a longer tubular mounting bracket structure, the vertical portion of the mounting bracket structure located below the upper door hinge functions to reduce the scratching of paint on the side of the vehicle to which it is attached from repeated contact with branches, brush, and other natural materials encountered during off-road excursions. However, as an option, a separate brush guard accessory can be attached to the elongated portion of the tubular mounting bracket structure for even more protection of the vehicle paint from off-road contact.

The invention thought to be most closely related to the present invention is that disclosed in U.S. Pat. No. 4,818,088 to Sacknoff (1989). However, the Sacknoff device engages a different hinge than is used by the present invention, and the Sacknoff invention also uses a different portion of the hinge for its connection. Instead of the sliding manner in which the present invention tubular bracket covers the remaining tubular portion of the door hinge structure still attached to the vehicle after its doors are removed, the distal end of the Sacknoff invention is secured by fasteners to the associated flat portion of one of the hinges on the hood of the vehicle used to lower the front windshield. No other apparatus or method is known that functions in the same manner as the present invention or provides all of its advantages.

BRIEF SUMMARY OF THE INVENTION

It is the primary object of this invention to provide a side view mirror mounting bracket that is sturdy in construction, has a sturdy connection to the supporting vehicle when in its position of use, and is easily and rapidly installed and removed. It is also an object of this invention to provide a side view mirror mounting bracket structure that is not likely to scratch the paint of the vehicle during its attachment or removal, or during its use. A further object of this invention is to provide a side view mirror mounting bracket structure that has a uniform and aesthetically appealing look with the vehicle to which it is attached. It is also an object of this invention to provide a side view mirror mounting bracket structure that can be easily connected upside down relative to the vehicle for rock climbing applications, such as but not limited to monitoring the amount of clearance under the vehicle. It is a further object of this invention to provide a side view mirror mounting bracket structure that has durable construction and requires little refurbishment between uses. A further object of this invention is to provide a side view mirror mounting bracket structure that can be used to mount devices other than mirrors to a motor vehicle after its doors have been removed.

The present invention, when properly made and used, will provide a means for sturdily mounting side view mirrors to a motor vehicle after its doors have been removed, and wherein the original side view mirrors had been mounted to the doors. It comprises a tubular mounting bracket that is centrally angled to follow the rearwardly inclined line of the motor vehicle's windshield, with the passenger side bracket having a slightly different configuration from the driver side bracket to optimize driver visibility. Each present invention mounting bracket has an open-ended slot in its proximal end and a mirror connected to its distal end. Preferably also, but not critical, each present invention mounting bracket has an end cap secured to its distal end to seal its interior surfaces from exposure rain and other weathering elements, and a scratch-resistant coating on its proximal end and/or any other part of it expected to come into contact with the vehicle's paint during installation, removal, and/or use. To install and remove a present invention mounting bracket, one would first remove the doors of the targeted motor vehicle. Then, to install one of the mounting brackets in its typical position of use, a set screw or screws attached to the bracket would be loosened and the slotted end of the bracket would be allowed to slide over the portion of the door hinge body remaining attached to the vehicle adjacent to the door opening. If the mounting bracket is sufficiently elongated to cover both of the door hinges remaining on the vehicle, a second slot with a closed configuration is used for sliding a contemplated central portion of the mounting bracket over the upper door hinge body, with the slotted proximal end simultaneously sliding downwardly over the lower one of the door hinge bodies so that the elongated tubular mounting bracket is firmly attached to both available door hinge bodies on the motor vehicle. Once the tubular mounting bracket or elongated tubular mounting bracket is securely positioned over the hinge body or bodies and in its usable position, the set screw or screws would be tightened. Installation is the same for both sides of the vehicle. For removal, the process is reversed. The set screw or screws are loosened. The short or elongated tubular mounting bracket is then caused to slide upwardly to uncover the door hinge bodies secured to the vehicle adjacent to the vehicle's door opening, after which the vehicle's doors can be replaced. Although the most preferred embodiment of the shortened tubular mounting bracket of the present invention has a length dimension that is approximately twelve inches and a circular cross-sectional configuration, it is contemplated for the length and cross-sectional configurations of other preferred embodiments of the present invention mounting brackets to be different. Upside down mounting of the present invention brackets is also possible, such as when there is a need to monitor clearance under the motor vehicle to which it is attached, and the present invention device can be used to mount brush guards, lights, steps or footholds, reflectors, and/or other safety-related devices to a motor vehicle after its doors are removed.

The description herein provides preferred embodiments of the present invention but should not be construed as limiting its scope. For example, variations in the type of material used for the tubular mounting bracket structure; the length dimension and cross-sectional configurations of the tubular mounting bracket structure; the angle at which the tubular mounting bracket structure is bent; the sizes of the holes through the tubular mounting bracket structure; the size and configuration of the mirror attached to the distal end of the tubular mounting bracket structure; the type and number fasteners used to secure the tubular mounting bracket structure to the remaining door hinge, if any; and the type, length dimension, and thickness dimension of the non-scratch coating used on the proximal end of the tubular mounting bracket structure, other than those shown and described herein, may be incorporated into the present invention. Thus the scope of the present invention should be determined by the appended claims and their legal equivalents, rather than being limited to the examples given.

DETAILED DESCRIPTION OF PREFERRED EMBODIMENTS

Figure 1:
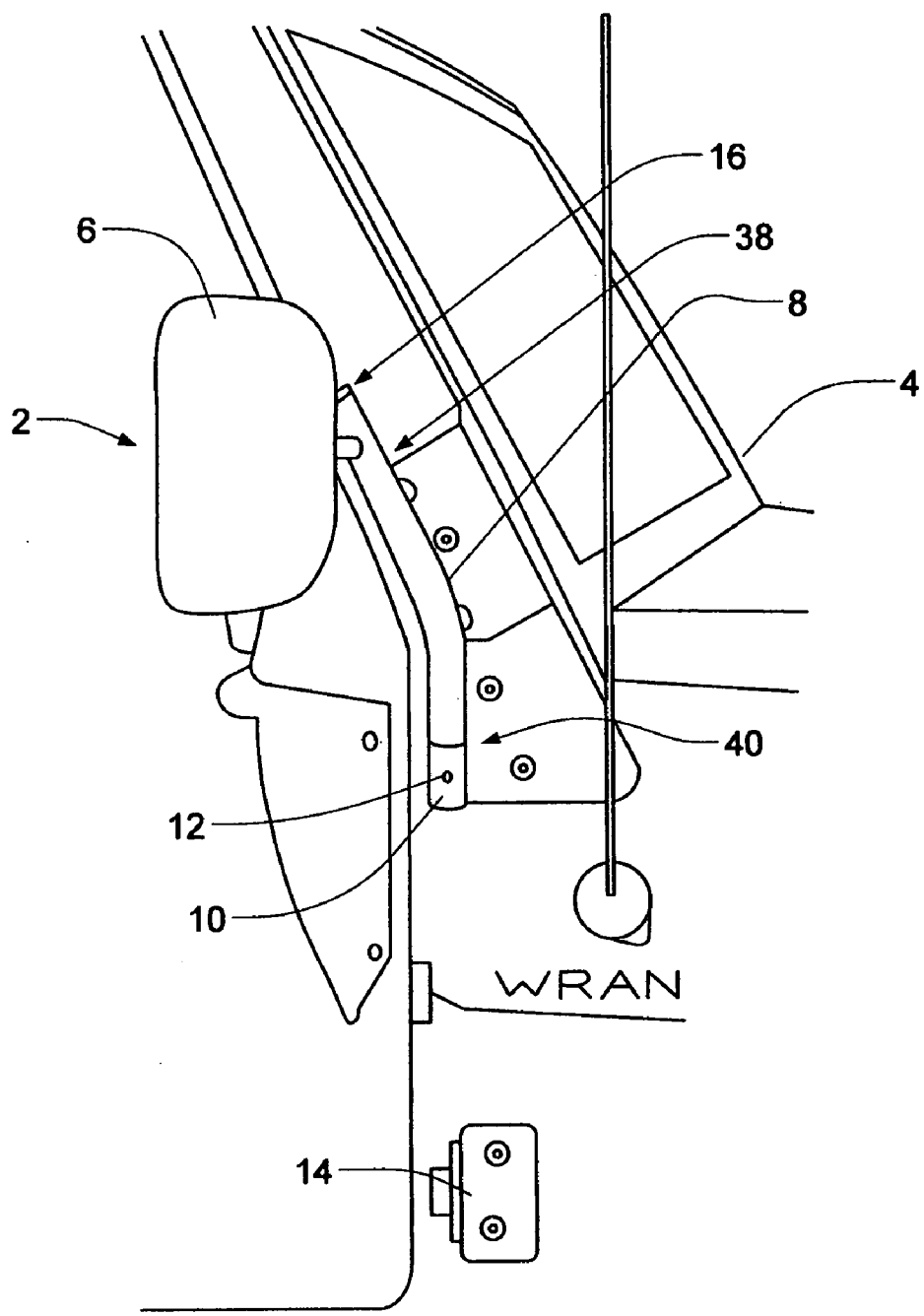
FIG. 1 is a side view of a first preferred embodiment of the present invention attached to a vehicle after its doors are removed.
Figure 2:
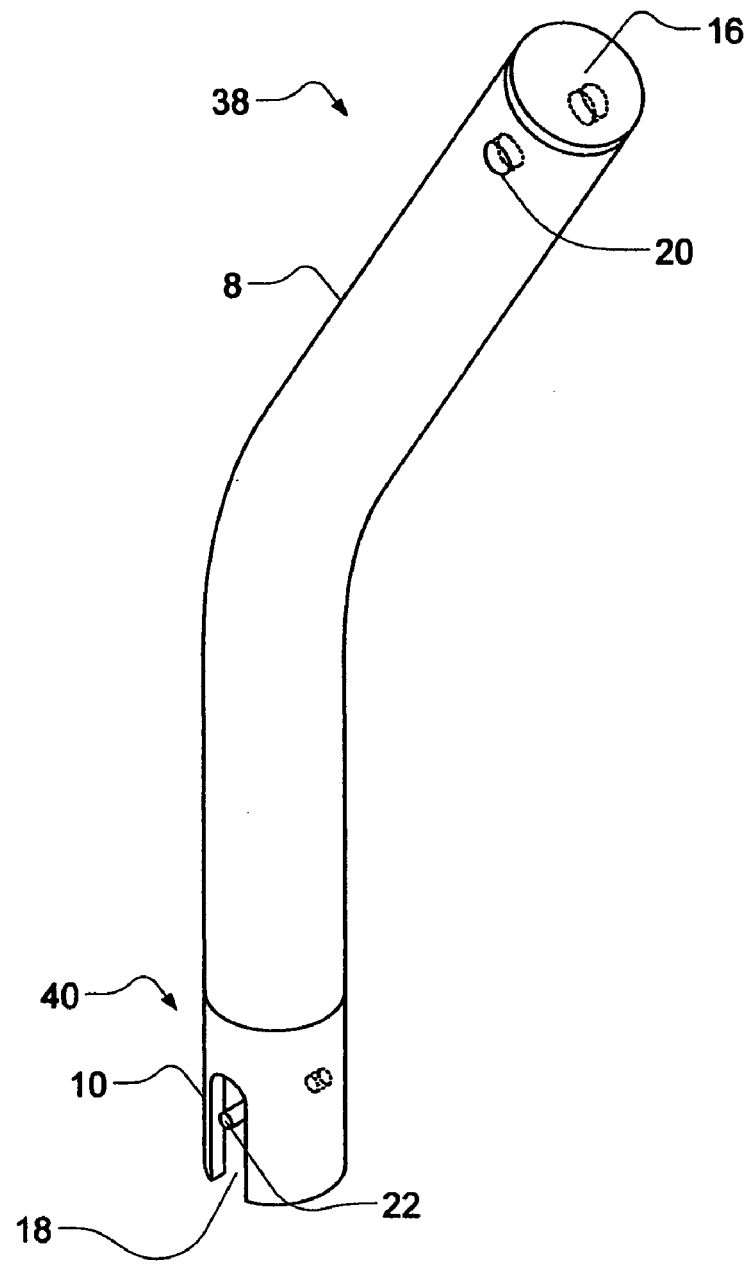
FIG. 2 is a side view of the first preferred embodiment of the present invention used for the passenger side of the vehicle.
Figure 3:
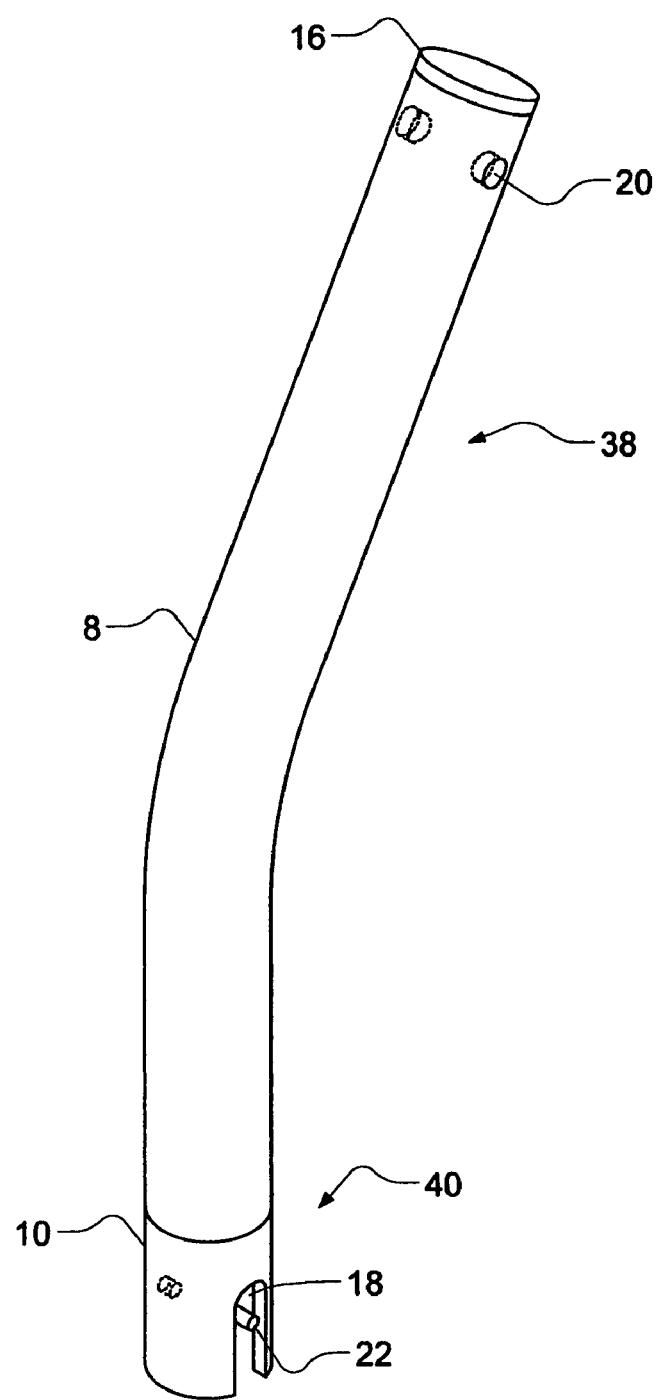
FIG. 3 is a side view of the most preferred embodiment of the present invention used for the driver's side of the vehicle.
Figure 4:
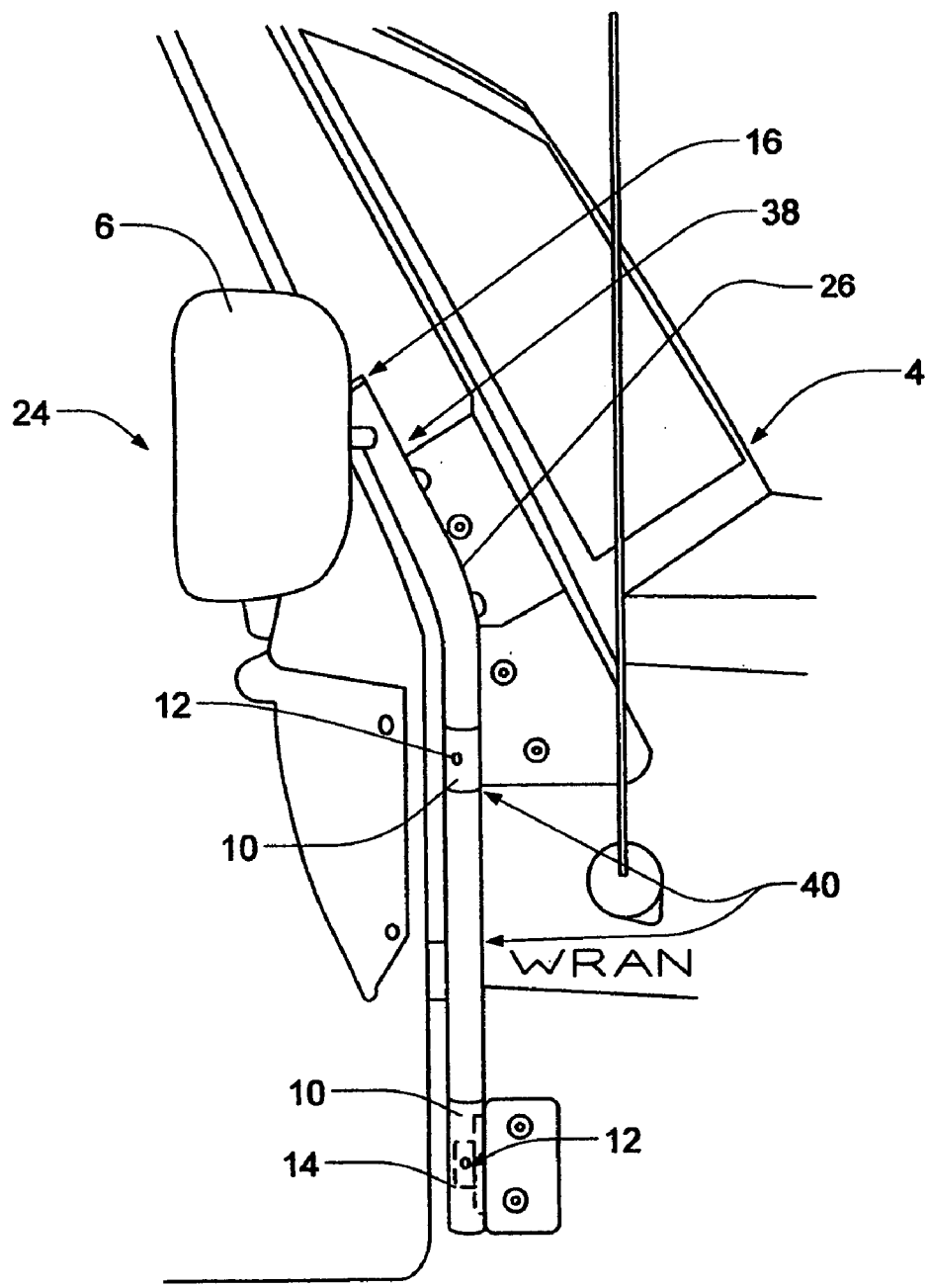
FIG. 4 is a side view of a second preferred embodiment of the present invention in its usual position of use and having an extended length that allows sliding connection over the two spaced-apart hinge bodies that remain on the side of a vehicle after its doors are removed.
Figure 5:
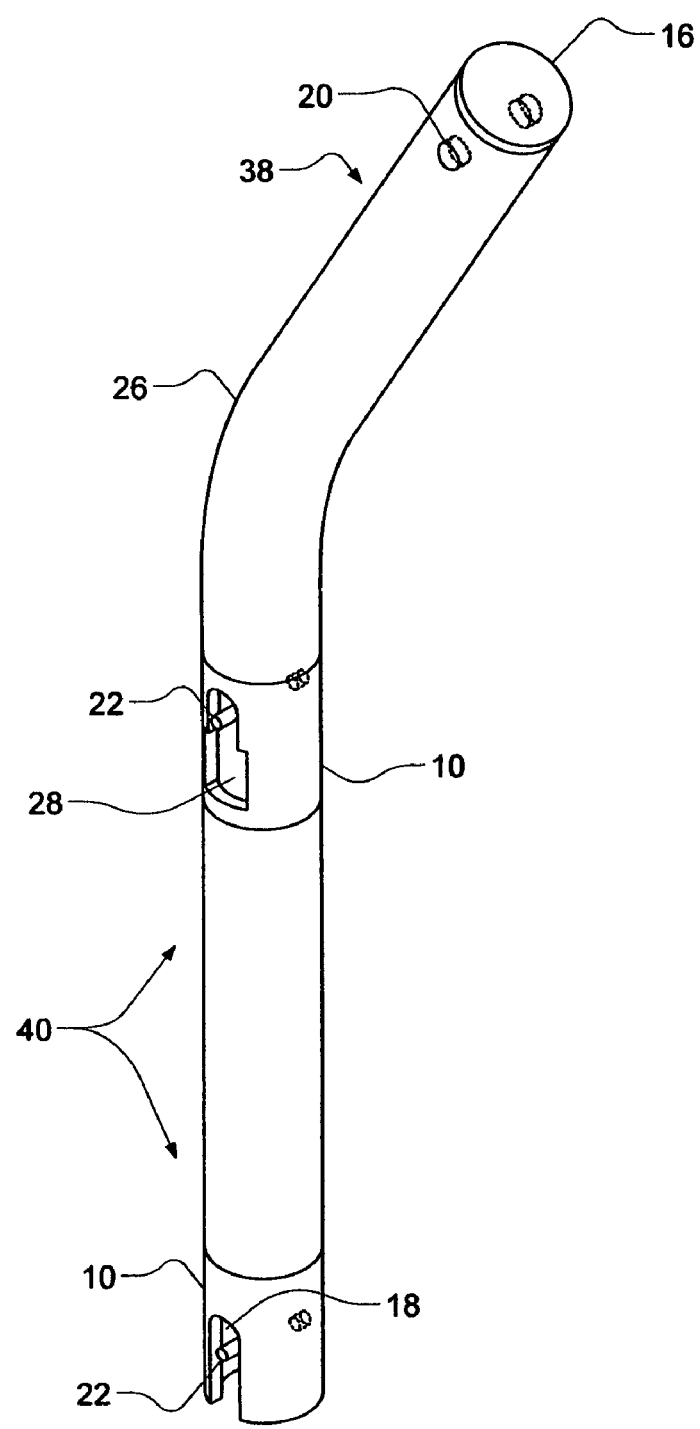
FIG. 5 is a back view of the second preferred embodiment of the present invention with two areas of connection to the hinge bodies on the vehicle.
Figure 6:
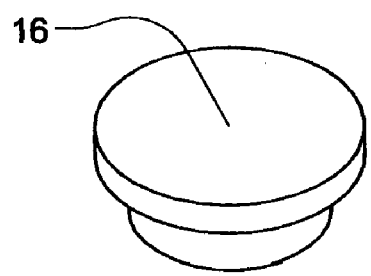
FIG. 6 is a perspective view of the end cap used with preferred embodiment mounting brackets of the present invention.
Figure 7:
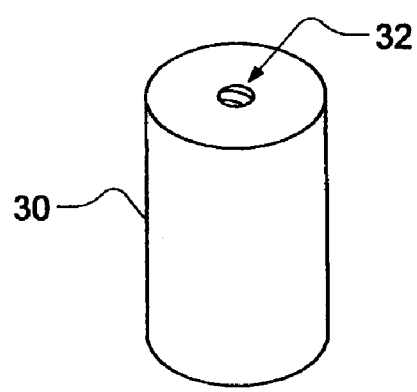
FIG. 7 is a hole plug optionally usable with the preferred embodiment mounting brackets of the present invention.
Figure 8:
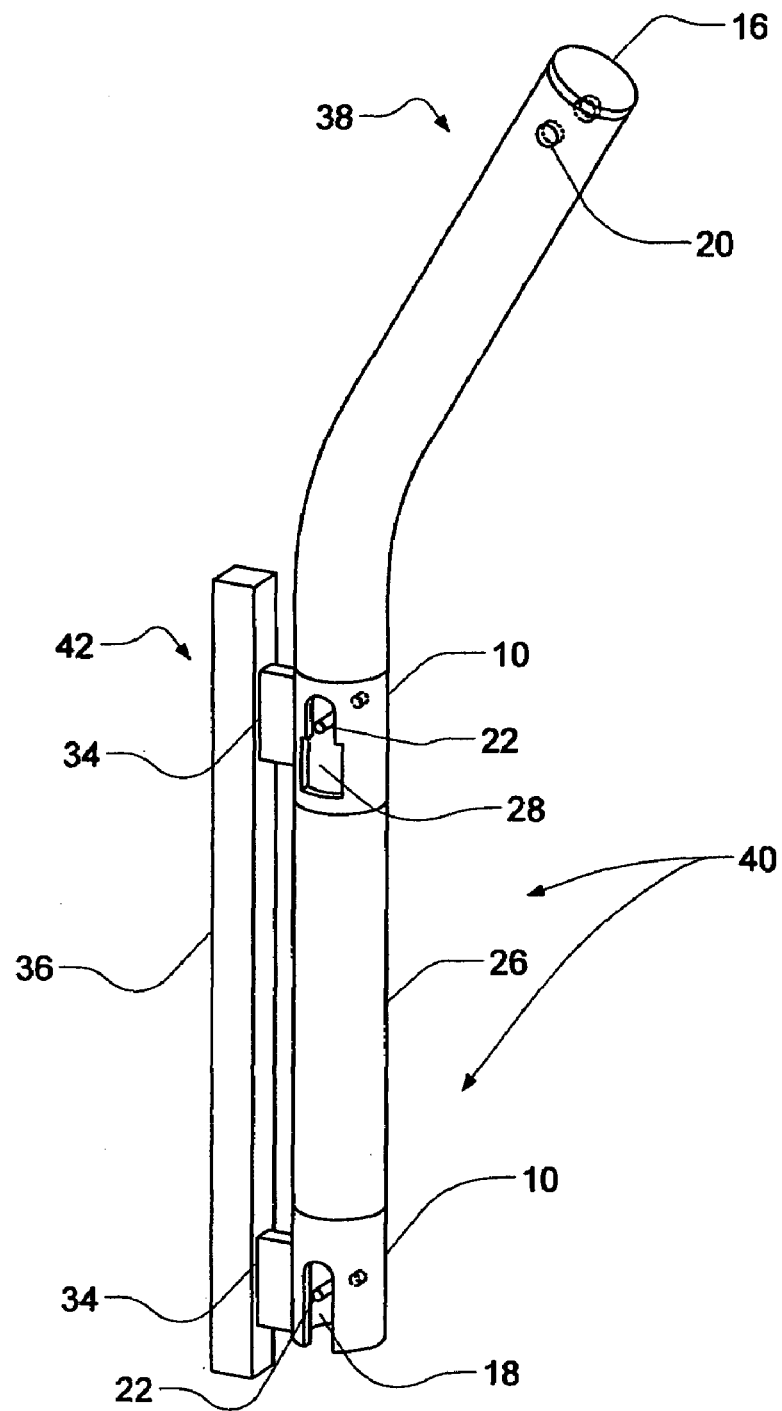
FIG. 8 is a side view of a third preferred embodiment of the present invention in its usual position of use and having an extended length that allows sliding connection over the two spaced-apart hinge bodies that remain on the side of a vehicle after its doors are removed, and which also has a brush guard.
Figure 9:
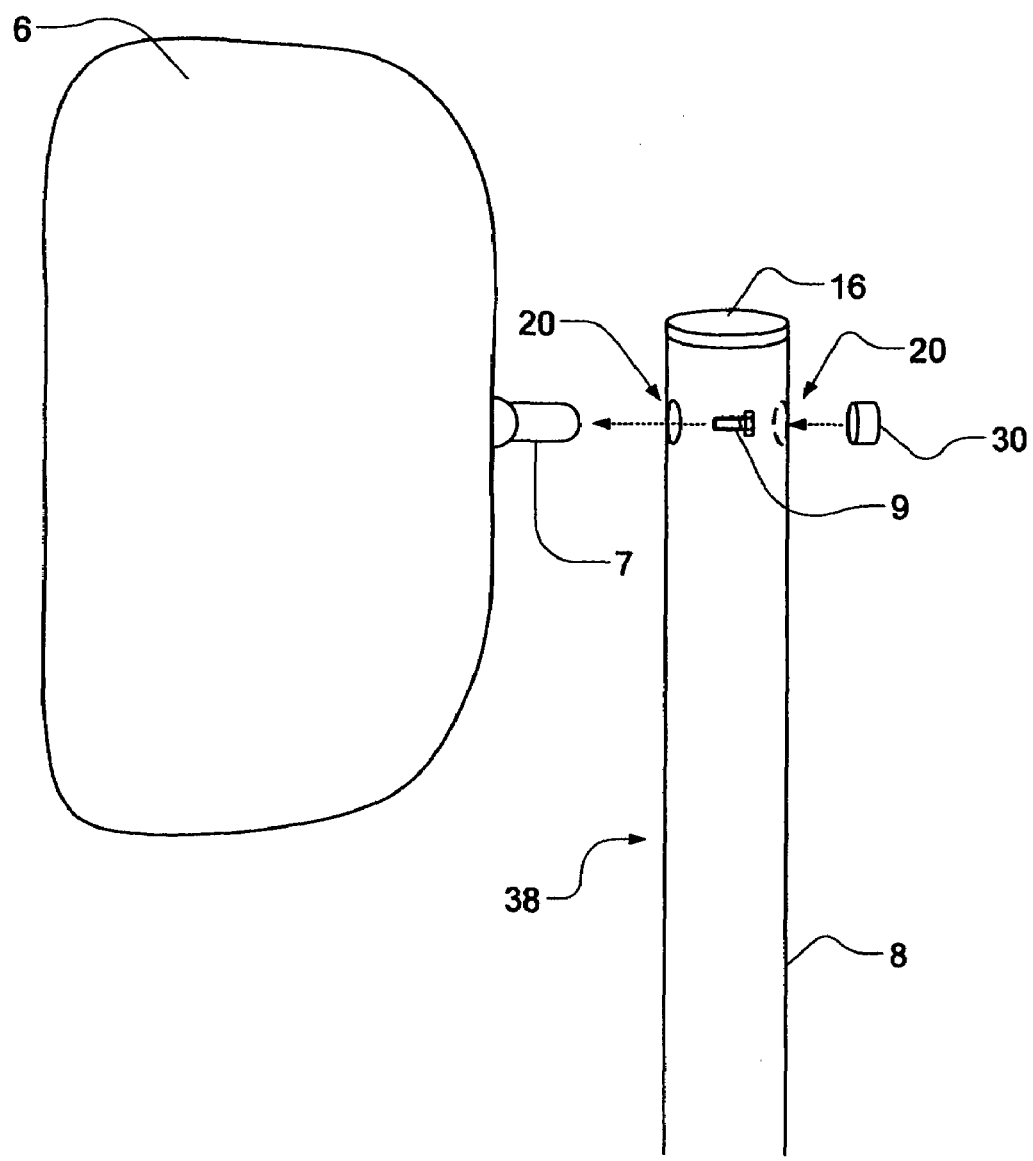
FIG. 9 is a perspective view of the distal end of a tubular mounting bracket.
Figure 10:
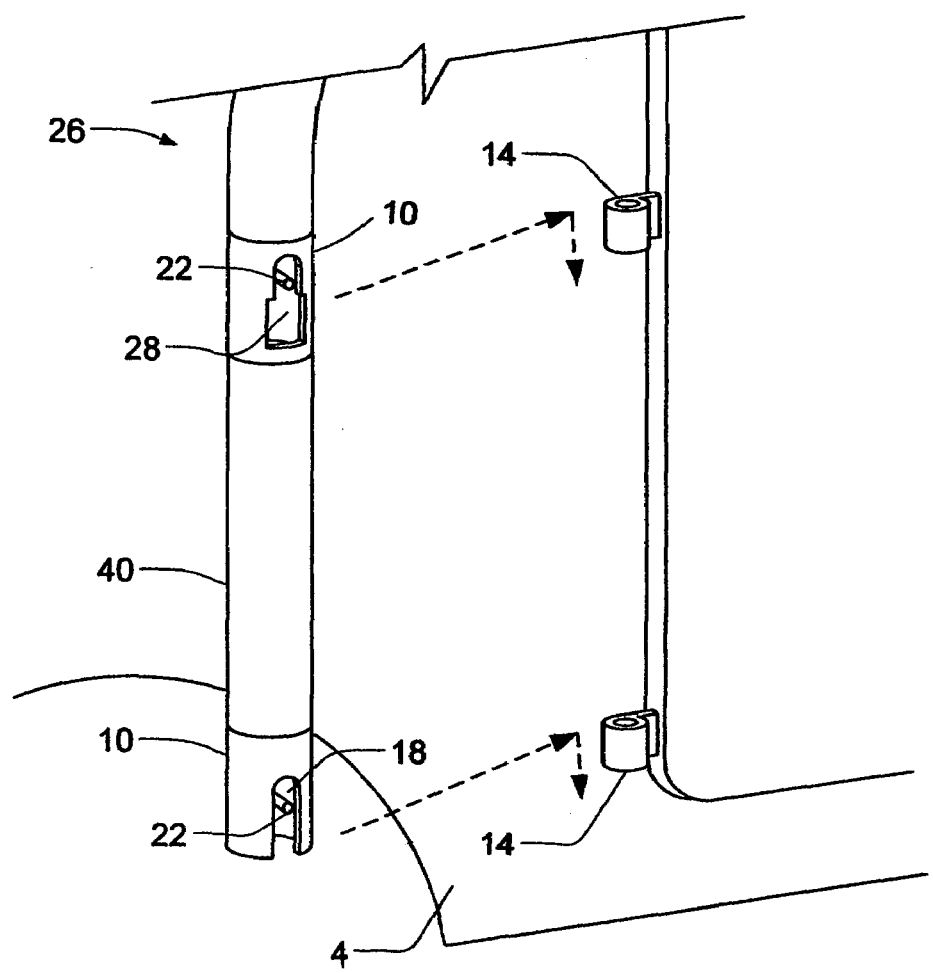
FIG. 10 is a perspective view of an elongated tubular mounting bracket aligned with exposed door hinges prior to installation.

FIGS. 1-8 show three preferred embodiments of the present invention and optional accessories employed to enhance its use. FIGS. 1-3 show a first preferred embodiment 2 of the present invention having a short tubular mounting bracket 8 with a distal end 38 and a proximal end 40, while FIGS. 4-5 shows a second preferred embodiment 24 of the present invention having an elongated tubular mounting bracket 26 with an elongated proximal end 40 that slides over and covers two vertically spaced-apart door hinges 14 on vehicle 4. In addition, FIG. 6 shows an end cap 16 for sealing the top of the distal end 38 of tubular mounting bracket 8, FIG. 7 shows a plug 30 with an internally threaded bore 32 that is employed to expand within a second open mirror mounting hole 20 after a first fastening means 9 in the form of either a hex headed bolt, a machine threaded screw (Phillips, slotted, or Allen tipped hole), or similar fastener has passed through the open distal end 38, been inserted through a first open mirror mounting hole 20, a tool has tightened the first fastening means 9 to the internally threaded post 7 on an accessory, such as a mirror 6, and then the tool has been removed so as to leave the second open mirror mounting hole 20 exposed (see FIG. 9). In simple terms, the plug 30 expands in the exposed unused mirror mounting hole 20 so as to prevent unwanted items from entering into the interior of the tubular mounting bracket 8 or elongated tubular mounting bracket 26. and FIG. 8 shows a third preferred embodiment 42 of the present invention having a brush guard 36, which can also be configured to include a foothold or step, such as but not limited to the configuration illustrated by the bottommost connecting member 34. In the ensuing disclosure, the word 'bracket' may be interpreted as singular or plural according to the context in which it is used, with the reverse being true for use of the word 'brackets'.

FIG. 1 shows a side view mirror 6 secured to the distal end 38 of a short tubular mounting bracket 8, with its proximal end 40 being secured over the remaining portion of a door hinge body 14 on a vehicle 4 after its doors (not shown) have been removed. Although the door hinge body 14 supporting proximal end 40 is hidden from view in FIG. 1, it is similar to the door hinge body 14 visible directly below it. One screw 12 is shown positioned through proximal end 40 to secure it to the door hinge body 14 on vehicle 4. It is preferred that the tip of screw 12 be coated with a non-scratch material 10 so that it removes no paint from the surface of door hinge body 14 when it is tightened within the threaded bracket mounting hole 22 shown in FIGS. 2 and 3. Although one screw 12 has been found to be sufficient for a strong connection between tubular mounting bracket 8 and door body hinge 14, the number of screws 12 used is not critical and it is also contemplated for proximal end 40 to have more than one threaded bracket mounting hole 22 for connection of tubular mounting bracket 8 to door body hinge 14. In addition, FIG. 1 shows a non-scratch coating 10 on the proximal end 40 of tubular mounting bracket 8, so that it will also remove no paint from the surface of door hinge body 14 when it is caused to slide over door hinge body 14 during the repeated connection and removal of tubular mounting bracket 8 to/from vehicle 4. Although not shown in FIG. 1, but visible in FIGS. 2 and 3, an open-ended slot 18 permits the downward sliding of proximal end 40 over door hinge body 14. The amount of non-scratch material 10 used can also be more or less than is shown in FIG. 1. Also, although not strictly limited thereto, it is anticipated for tubular mounting bracket 8 to have an angled configuration that allows distal end 38 to follow the rearward slope of vehicle's 4 front windshield. Typically, although not limited thereto and only used to provide an example herein, should tubular mounting bracket 8 be made from one-inch diameter, 16-gauge, buffed and polished stainless steel, the length of shortened tubular mounting bracket 8 would be approximately twelve inches, it would have an approximately thirty-two degree centrally located angle or bend, mirror mounting hole 20 through both sides of distal end 38 would be approximately five-sixteenths of an inch in diameter, slot 18 would have length and width dimensions respectively of approximately one-and-one-half inches and approximately one-half of an inch, and the threaded bracket mounting hole 22 would be aligned with slot 18 and approximately one-fourth inches in diameter. FIG. 1 further shows an optional end cap 16 positioned within the distal end 38 of tubular mounting bracket 8 to seal it against weathering elements. While FIG. 1 shows a configuration and proportional size of mirror 6 that works well with tubular mounting bracket 8, mirrors having other size dimensions and configurations can also be used. Although the length of tubular mounting bracket 8 can have longer or shorter dimensions than are shown in FIG. 1, unless design considerations dictate a longer dimension, cost considerations would generally make the length dimension of tubular mounting bracket 8 the minimum amount necessary for it to effectively perform its intended function.

FIGS. 2 and 3 respectively show the shortened tubular mounting brackets 8 used for the passenger side and the driver's side of vehicle 4. The distal end 38 of the passenger side tubular mounting bracket 8 is shown in FIG. 2 to be slightly longer than the distal end 38 of the driver's side tubular mounting bracket 8 shown in FIG. 3, to allow its attached mirror 6 (shown in FIG. 1) to be visible by a driver (not shown) sitting on the opposite side of vehicle 4. An end cap 16 is shown secured within the distal end of both tubular mounting bracket 8, and the tubular mounting brackets 8 shown in FIGS. 2 and 3 each have a coating of non-scratch material on its proximal end 40 to prevent the removal of paint from door hinge body 14 as tubular mounting bracket 8 is caused to slide over door hinge body 14 during the placement of tubular mounting bracket 8 into its usable position. FIGS. 2 and 3 also show the tubular mounting brackets 8 each having a mirror mounting hole 20 through its distal end 38, a slot 18 through its proximal end 40, and a bracket mounting hole 22 aligned with slot 18 and through the opposed portion of proximal end 40. Although a circular cross-sectional configuration is shown in FIGS. 1-3 for tubular mounting bracket 8, other cross-sectional configurations are also contemplated, such as but not limited to rectangular or octagonal, if they are dimensioned and otherwise configured to closely cover door hinge body 14 without allowing much room for movement or vibration therebetween once tubular mounting bracket 8 fixed in its usable position over door hinge body 14. As previously mentioned, tubular mounting bracket 8 can have many cross-sectional configurations and dimensions, such as but not limited to a one-inch or two-inch diameter dimension. However, selection of materials for tubular mounting bracket 8 would be based mainly upon aesthetic and cost considerations, with standard sizes of materials often being used to reduce the cost of manufacture. The sizes and number of mirror mounting holes 20 and bracket mounting holes 22 are not critical, and they also may be moved in position from the locations shown in FIGS. 2 and 3. In addition, the materials used for tubular mounting bracket 8 can include but are not limited to steel, aluminum, and sturdy UV-resistant plastic.

FIGS. 4 and 5 show a second preferred embodiment 24 of the present invention having an elongated tubular mounting bracket 26 with a proximal end 40 that is longer than that shown in FIG. 1, so that it covers both door-hinge bodies 14 and uses both for its support. FIG. 4 shows a side view mirror 6 secured to the distal end 38 of elongated tubular mounting bracket 26, an end cap 16 in the top of distal end 38 to seal the interior of elongated tubular mounting bracket 26 from weathering elements, and the proximal end 40 of second preferred embodiment 24 being secured with two screws 12 to upper and lower door hinge bodies 14 on a vehicle 4 after its doors (not shown) have been removed. Although one screw 12 is shown inserted through each area of non-scratch material 10, more than one screw 12 can be used to provide a strong connection between elongated tubular mounting bracket 26 and door body hinge 14, if required by an application. The location of screws 12 can also be different from that shown in FIG. 4. It is preferred that the tip of screw 12 be coated with a non-scratch material 10 so that it removes no paint from the surface of door hinge body 14 when it comes in contact with it. The two areas of non-scratch coating 10 on the proximal end 40 of elongated tubular mounting bracket 26, are also provided so that it will also remove no paint from the surface of door hinge body 14 when it is caused to slide over door hinge body 14 during the repeated connection and removal of elongated tubular mounting bracket 26 to/from vehicle 4. As shown in FIG. 5, a keyhole slot 28 and an open-ended slot 18 together permit the downward sliding of proximal end 40 over the two spaced-apart door hinge bodies 14 on vehicle 4. The amount of non-scratch material 10 used can also be more or less than is shown in FIGS. 4 and 5. Also, although not strictly limited to the specific configuration shown in FIGS. 4 and 5, it is anticipated and preferred for elongated tubular mounting bracket 26 to have a centrally angled or bent design that allows its distal end 38 to closely follow the rearward slope of vehicle's 4 front windshield. An approximate bend of thirty-two degrees is generally contemplated for elongated tubular mounting bracket 26, although not strictly limited thereto. While FIG. 4 shows a configuration and proportional size of mirror 6 that works well with elongated tubular mounting bracket 26, mirrors having other size dimensions and configurations can also be used. Further, the length of elongated tubular mounting bracket can be longer or shorter than shown in FIG. 4.

FIGS. 6 and 7 show enlarged views of an optional end cap 16 for use in the top portion of the distal end 38 of tubular mounting bracket 8 and of a proposed configuration for a hole plug with internally threaded bore 32 that could be used with mirror mounting hole 20 to strengthen the connection between tubular mounting bracket 8 and mirror 6, as well as cover the hole needed to secure mirror 6 in place. The configurations of end cap 16 and hole plug 30 can be different from that shown as long as they still allow end cap 16 and hole plug 30 to fulfill their intended functions. Also, end cap 16 can be made from rigid or resilient materials, with the connection to tubular mounting bracket 8 via snap-fit or other connection. Further, end cap 16 can be removably or permanently installed in the top portion of distal end 38. If any end cap 16 is used to seal the bottom portion of proximal end 40, it would require proximal end 40 to extend somewhat beyond door hinge body 14 and remain removable from tubular mounting bracket 8 so that it can be easily uninstalled when doors are again needed on vehicle 4. It is generally contemplated for hole plug 30 to remain removable from tubular mounting bracket 8 or elongated tubular mounting bracket 26, so that a replacement mirror 6 can be easily secured to distal end 38 when required.

FIG. 8 shows a third embodiment 42 of the present invention having an elongated tubular mounting bracket 26 with a distal end 38 that is centrally angled to follow the rearward incline of the windshield of vehicle 4, an end cap 16 sealing the top of distal end 38, an elongated proximal end 40, and two coated areas of non-scratch material 10 spaced apart a sufficient amount to align with the door hinge bodies 14 remaining on vehicle 4 after its doors (not shown) are removed. Although not limited thereto, the angle in distal end 38 is determined according to aesthetic, aerodynamic, and/or safety related purposes. The amount of non-scratch material 10 used can also be more or less than is shown in FIG. 8. As in FIG. 5, FIG. 8 shows a central keyhole slot 28 and a bottom edge open-ended slot 18 that together permit the downward sliding of proximal end over the two spaced-apart door hinge bodies 14 on vehicle 4. One mirror mounting hole 20 is shown through distal end 38, while two bracket mounting holes 22 are shown in the coated areas having non-scratch material 10. One of the two bracket mounting holes 22 is also aligned with keyhole slot 28, with the other bracket mounting hole 22 being aligned with open slot 18. In addition, FIG. 8 shows a brush guard 36 attached by upper and lower connecting pieces 34 to elongated tubular mounting bracket 26. Although brush guard 36 could also have an arcuate or arcu-linear configuration, as needed for specific applications, a substantially unbent brush guard is shown. Further, although FIG. 8 shows two connecting pieces 34 attached to elongated tubular mounting bracket 26 in the coated areas having non-scratch material 10, more or less than the two connecting pieces 34 shown can be used to secure brush guard 36 to elongated tubular mounting bracket 26, and connecting pieces 34 can be joined/secured to elongated tubular mounting bracket 26 anywhere along its length that is convenient, and not just in the coated areas having non-scratch material 10. Also, although not shown in FIG. 8 and not critical, an end cap can be secured in one or both ends of brush guard 36. Additionally, since FIG. 8 is merely one representation of how a brush guard 36 can be connected to elongated tubular mounting bracket 26, the relative length and width proportions of elongated tubular mounting bracket 26 and brush guard 36 can vary from that shown in FIG. 8. Should connecting pieces 34 be sufficiently large, the bottom connecting piece 34 could be used as a foothold or step. However, in the alternative, although not shown, a separate and perhaps removable foothold or step could be affixed or otherwise secured to elongated tubular mounting bracket 26, brush guard 36, and/or one or more connecting pieces 34. In the same manner, although not shown, safety reflectors, lights, mirrors, and other accessories adaptable to off-road excursions can be added to vehicle 4 via connection to elongated tubular mounting bracket 26, brush guard 36, and/or one or more connecting pieces Further, although not shown, safety reflector strips may be adhered to elongated tubular mounting bracket 26, brush guard 36, and/or connecting piece 34, as needed. Also, for visibility under vehicle 4 when needed, one or both elongated tubular mounting brackets 26 may be secured to door hinge bodies 14 in an inverted orientation to employ mirror 6 in that capacity.

To manufacture the preferred embodiments of the present invention, one would cut tubular mounting bracket 8 or elongated tubular mounting bracket 26 to the needed length. Preferably, a milling machine or a stamp press mill (not shown) would be used to form open slot 18. Keyhole slot 28 would also be made, if needed, in the area where it could engage the upper door hinge body 14. After rotating tubular mounting bracket 8 or elongated tubular mounting bracket 26 one-hundred-eighty degrees, a bracket mounting hole 22 would be drilled in alignment with each open slot 18 and keyhole slot 28 present. The bracket mounting hole 22 aligned with open slot 18 is preferably drilled approximately three-fourths of an inch from the bottom of proximal end 40. Threads would then be tapped into hole 22. Mirror mounting holes 20 are then drilled through both sides of distal end 38 and made approximately three-fourths of an inch from the top of distal end 38. Tubular mounting bracket 8 or elongated tubular mounting bracket 26 is then bent or angled approximately five inches from the open end of open slot 18. The preferred angle used is approximately thirty-two degrees. An end cap 16 can be placed within the top of distal end 38 to seal it, and a hole plug 30 colored and textured to blend in with the outer surface of tubular mounting bracket 8 or elongated tubular mounting bracket 26 is then used to fill in the second hole 20 in distal end, after mirror 6 was tightened in place with a conventional bolt and nut (not shown). Without the second hole 20, there would be no easy way in which to install or exchange mirror 6. The above process is then repeated in mirror image to mount a mirror 6 on the other side of vehicle 4. Preferably end cap 16 and hole plug 30 are maintained in removable engagement with tubular mounting bracket 8 and elongated tubular mounting bracket 26 so that mirror 6 can be replaced, if needed. A threaded set screw having a tip coated with non-scratch material 10, such as but not limited to a screw with a one-fourth of an inch diameter and a nylon tip, is then partially threaded into bracket mounting hole 22. Also, the proximal end 40 of tubular mounting bracket 8 and elongated tubular mounting bracket 26, as well as any other portions intended to come into contact with the paint on vehicle 4, will be coated with non-scratch material 10, such as but not limited to a plastic dip which must be allowed to dry prior to use in any application.

To install and remove tubular mounting bracket 8 or elongated tubular mounting bracket from a vehicle 4, one would first remove its doors (not shown) by lifting it off of its hinges. Screw or screws 12 would then be sufficiently loosened to allow open-ended slot 18 to slide over the tubular portion of a door hinge body 14 remaining on vehicle 4. For elongated tubular mounting bracket 26, one must also make certain that the upper door hinge body 14 engages successfully with keyhole slot 28. Thereafter, once tubular mounting bracket 8 or elongated tubular mounting bracket 26 is in its usable position, screw or screws 12 are tightened to secure it in place, with screw 12 being made from non-scratch material 10 or having non-scratch material on the tip of screw 12 to prevent the scratching of any paint on door hinge body 14 during present invention use. Installation is the same on both sides, whereafter mirrors 6 are adjusted for maximum driver visibility. To remove tubular mounting bracket 8 or elongated tubular mounting bracket 26, one would first loosen screw or screws 12, and then slide tubular mounting bracket 8 or elongated tubular mounting bracket 26 in an upward direction until tubular mounting bracket 8 or elongated tubular mounting bracket 26 is no longer engaged with door hinge body or bodies 14. Afterwards, the doors of vehicle 4 could be reinstalled.

I claim:

1. A tubular mounting bracket for sliding attachment over at least one of the tubular door hinge bodies remaining on a vehicle with removable doors after door removal, said bracket comprising:
   a tubular mounting bracket member with a central angle, a distal end, and a proximal end;
   opposed accessory mounting holes through said distal end;
   an open-ended slot formed through said proximal end;
   a bracket mounting hole opposed from and aligned with said open-ended slot;
   a first fastening means adapted for insertion through at least one of said opposed accessory mounting holes; and
   a second fastening means adapted for secure engagement within said bracket mounting hole whereby when said proximal end of said tubular mounting bracket member is caused to slide over one of the tubular door hinge bodies on the vehicle and said second fastening means is used through said bracket mounting hole to tighten said tubular mounting bracket member against the underlying door hinge body, said first fastening means can be used to mount an accessory to at least one of said accessory mounting holes for vehicle enhancement.

2. The bracket of claim 1 wherein said second fastening means comprises non-scratch material.

3. The bracket of claim 1 wherein said proximal end comprises non-scratch material.

4. The bracket of claim 1 wherein the accessory attached via at least one of said opposed accessory mounting holes is a side view mirror.

5. The bracket of claim 1 wherein the vehicle has a rearwardly inclined windshield and said central angle is formed to allow said distal end of said tubular mounting bracket member to closely follow the windshield incline.

6. The bracket of claim 1 wherein said proximal end of said tubular mounting bracket member is sufficiently elongated to span and slide over at least two of the tubular door hinge bodies remaining on a vehicle after door removal.

7. The bracket of claim 6 further comprising at least one brush guard component connected to said tubular mounting bracket member.

8. The bracket of claim 6 further comprising connecting means between said tubular mounting bracket member and said brush guard that is adapted to function as a foot hold and a step.

9. The bracket of claim 1 further comprising end cap means for sealing the top of said distal end.

10. The bracket of claim 1 further comprising at least one hole plug adapted for temporarily covering at least one of said accessory mounting holes after accessory attachment.

11. The bracket of claim 10 wherein said hole plug is adapted to match said tubular mounting bracket member in color and texture so as to minimize its visibility.

12. A method of using a tubular mounting bracket for mounting accessories to a vehicle with removable doors after door removal, wherein after door removal at least one door hinge body remains attached to the vehicle, said method comprising the steps of:
   providing a tubular mounting bracket member with a central angle, a distal end, a proximal end, opposed accessory mounting holes through said distal end, an open-ended slot formed through said proximal end, and a bracket mounting hole opposed from and aligned with said open-ended slot;
   also providing a first fastening means adapted for insertion through at least one of said opposed accessory mounting holes, a second fastening means adapted for secure engagement within said bracket mounting hole, and at least one vehicle accessory;
   sliding said open-ended slot over one remaining door hinge body on the vehicle;
   inserting and tightening said second fastening means within said bracket mounting hole; and
   connecting said at least one vehicle accessory to at least one of said opposed accessory mounting holes.

13. The method of claim 12 wherein the order of performing said steps of sliding, inserting and tightening, and connecting is different.

14. The method of claim 12 wherein said second fastening means and said proximal end comprise non-scratch material.

15. The method of claim 12 wherein said at least one accessory is selected from a group consisting of side view mirrors, safety related devices, reflective devices, and illuminating devices.

16. The method of claim 12 wherein said step of sliding said open-ended slot over one remaining door hinge body on the vehicle is selected from a group consisting of sliding said open-ended slot downwardly over one remaining door hinge body on the vehicle to provide at least one accessory for use around the vehicle, and sliding said open-ended slot upwardly over one remaining door hinge body on the vehicle to provide at least one accessory for use under the vehicle.

17. The method of claim 12 wherein said tubular mounting bracket member is selected from a group consisting of tubular mounting bracket members sufficiently elongated to span and slide over at least two of the tubular door hinge bodies remaining on a vehicle after door removal, tubular mounting bracket members having said central angle configured to closely follow the vehicle's contour, tubular mounting bracket members having at least one brush guard component connected thereto, and tubular mounting bracket members having a connection to said brush guard component that is adapted to function as a foot hold and a step.

18. The method of claim 12 further comprising the steps of providing end cap means adapted for sealing the top of said distal end, and using said end cap to seal said distal end.

19. The method of claim 12 further comprising the steps of providing at least one hole plug adapted for temporarily covering at least one of said accessory mounting holes after accessory attachment, and using said at least one hole plug after accessory attachment to temporarily cover at least one of said accessory mounting holes.

20. The method of claim 19 wherein said hole plug is adapted to match said tubular mounting bracket member in color and texture so as to minimize its visibility.

* * * * *